Figure 6:
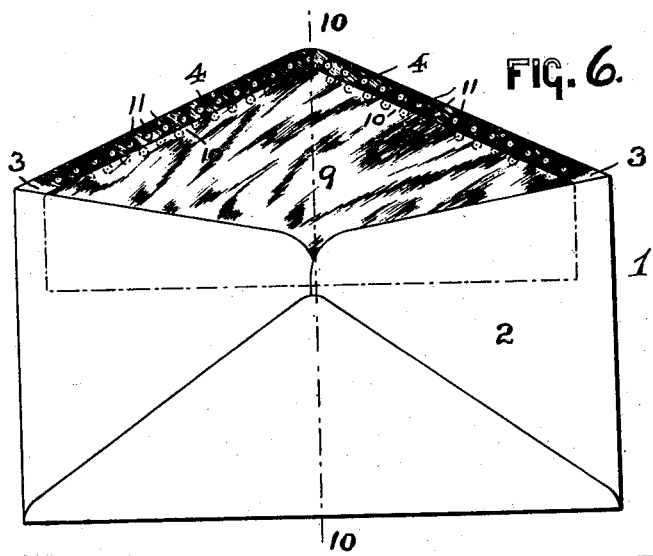

No. 705,470. Patented July 22, 1902.
H. G. STARMER.
MEANS FOR DETECTING TAMPERING WITH SEALED ENVELOPS.
(Application filed June 4, 1901.)
(No Model.)   2 Sheets—Sheet 1.
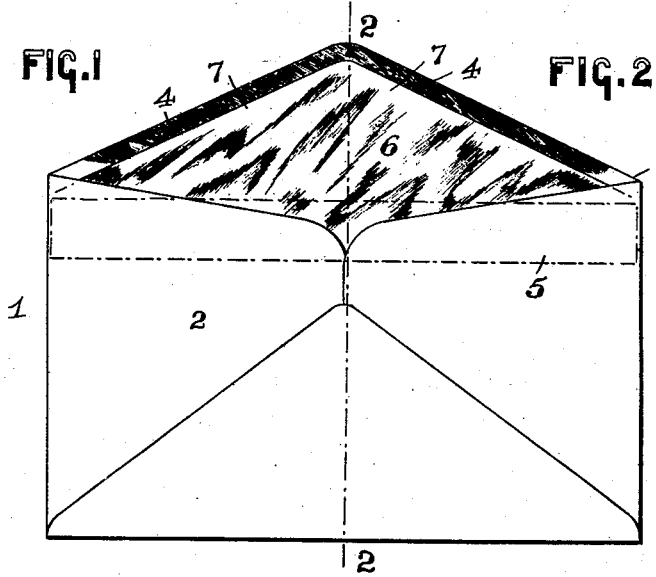
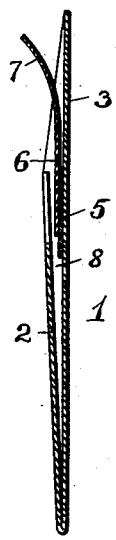
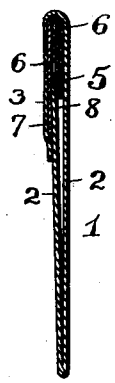
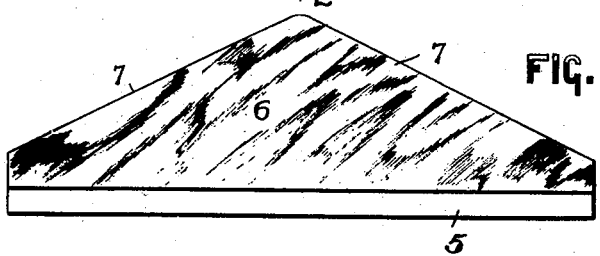
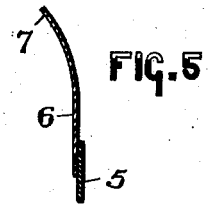
WITNESSES:
E. Van Ness.
Geo. D. Richards
INVENTOR:
HARRY G. STARMER
BY
Fred C. Fraentzel,
ATTORNEY No. 705,470. Patented July 22, 1902.
H. G. STARMER.
MEANS FOR DETECTING TAMPERING WITH SEALED ENVELOPS.
(Application filed June 4, 1901.)
(No Model.) 2 Sheets—Sheet 2.

WITNESSES:
E. Van Ness
Geo. S. Richards

INVENTOR:
HARRY G. STARMER
BY
Fred C. Fraentzel,
ATTORNEY

United States Patent Office.

HARRY G. STARMER, OF NEWARK, NEW JERSEY, ASSIGNOR OF ONE-HALF TO HERMAN E. L. BEYER, OF NEWARK, NEW JERSEY.

MEANS FOR DETECTING TAMPERING WITH SEALED ENVELOPS.

SPECIFICATION forming part of Letters Patent No. 705,470, dated July 22, 1902.

Application filed June 4, 1901. Serial No. 63,076. (No model.)

*To all whom it may concern:*

Be it known that I, HARRY G. STARMER, a citizen of the United States, residing at Newark, in the county of Essex and State of New Jersey, have invented certain new and useful Improvements in Means of Detection to Indicate that a Sealed Envelop Has Been Tampered With; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in envelops; and the invention has for its principal object to provide an envelop the sealing-flap of which can be sealed in the ordinary manner, but the envelop being provided with a means adapted to be arranged between the body of the envelop and the flap when the flap is sealed, the same providing a means of detection to indicate to the person who is properly authorized to open the envelop whether the envelop has been tampered with or not.

The primary purposes of this invention, therefore, are, first, to provide an envelop having between its body and the sealing-flap a piece of very thin material, such as tissue-paper or the like, which becomes sealed in place when the flap is sealed and the same being so very thin that it adheres firmly to the body and flap of the envelop and becomes torn and adheres in small pieces to the body as well as the flap when an unauthorized person endeavors to separate the flap from the body of the envelop by the insertion of the blade of a knife or other device, and, secondly, to provide an envelop having between its body and the sealing-flap a piece of material, such as thin tissue-paper or the like which has been previously prepared with a coloring-matter capable of being dissolved or undergoing liquefaction when an unauthorized person endeavors to separate the sealed flap from the body of the envelop by steaming the envelop.

My invention therefore consists in the novel envelop hereinafter more fully described, as well as in the several novel arrangements and combination of the parts for the purposes hereinabove stated, all of which will be more particularly set forth in the following specification, and then finally embodied in the clauses of the claim.

The invention is clearly illustrated in the accompanying drawings, in which—

Figure 7:
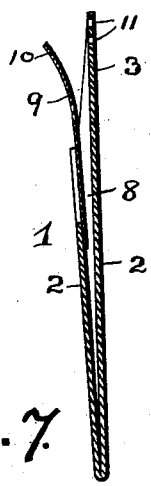
Figure 8:
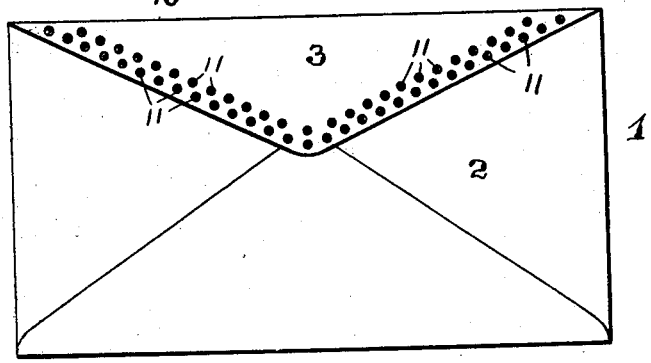

Figure 1 is a view of the back of the envelop with its sealing-flap open and provided with one means employed in connection with the envelop to readily indicate whether the sealed envelop has been tampered with. Fig. 2 is a vertical cross-section of the several parts, taken on line 2 2 in Fig. 1; and Fig. 3 is a similar section representing the arrangement of the several parts when the flap is sealed down upon the body of the envelop. Fig. 4 is a face view of the means of detection detached from the envelop, and Fig. 5 is a vertical cross-section of the same. Fig. 6 is a view of the back of an envelop with its flap unsealed and representing in connection therewith still another modified arrangement of the means of detection. Fig. 7 is a vertical cross-section of the said parts, and Fig. 8 is a back view of this form of envelop with the flap sealed upon the body of the envelop.

Similar numerals of reference are employed in all of the said drawings to indicate corresponding parts.

In the said drawings, 1 indicates the complete envelop, which may be of any desired size and shape and of any suitable construction, comprising a body 2 and sealing-flap 3, which is provided along its sealing edge with the usual application of gum 4, as clearly represented in Figs. 1 and 6 of the drawings.

In Figs. 1 to 5, inclusive, I have illustrated one means of detection which is arranged and constructed in such a manner that a sealed envelop cannot be tampered with either by trying to separate the sealed flap by means of a knife or other instrument or by steaming the envelop without that said means of detection will clearly indicate to the person who is properly authorized to open the envelop whether such envelop has been tampered with or not. The said means of detection consists, essentially, of a narrow piece of thin paper or cardboard 5 or other suitable material, to which is attached in any suitable manner a second piece of material 6, preferably a piece of tissue-paper. The upper marginal edge 7 of this piece of material 6 is preferably made to conform to the contour of the marginal and gummed edge of the flap 3, but is made slightly smaller, so that when the backing 5 is arranged in the pocket 8 of the envelop, as shown, the marginal edge portion 7 of the piece of material will partially come against the said gummed surface of the flap 3, but will not entirely cover the same. Thus it will be clearly evident that when the said gummed surface of the flap 3 is moistened and then turned over to be sealed against the back of the body of the envelop the said piece of material 6 is also turned over and its marginal edge portion is securely and permanently sealed in position between the outer face of the back of the body of the envelop and the inner gummed surface of the flap 3, as clearly illustrated in Fig. 3 of the drawings, and providing with the said flap 3 a double closure to the opening or mouth of the envelop. In practice I prefer to employ as a piece of material 6 a thin piece of tissue-paper which has the nature of firmly and closely adhering to the paper of the envelop when sealed in place in the manner just described. This arrangement of the thin tissue-paper between the sealed parts of the envelop causes them to be more thoroughly united and prevents accidental separation of the sealed parts, and when a sealed envelop is tampered with by the insertion of a knife-blade or other tool between the sealed parts the tissue-paper becomes torn by the movement of the tool, and thereby serves as a ready means of detection to indicate that the envelop has been tampered with. I furthermore desire to prepare the tissue-paper or the material 6 with a solutive coloring-matter which is capable of being dissolved or undergoes liquefaction should the envelop be steamed, thereby causing the solutive color or colors to "run" and spread over the several parts of the envelop. In this manner it will be impossible to tamper with an envelop by steaming without the colored material serving as a clear means of detection that the envelop has been tampered with.

Instead of providing the thin piece of material 6 with a backing 5, as in Figs. 1 to 5, inclusive, this backing may be dispensed with and a single piece of tissue-paper 9 or other piece of material practical for the purpose of my invention may be employed, as clearly indicated in Figs. 6 and 7. This piece of material 9 may be of any desired marginal configuration, the same being arranged against the inner face or within the pocket of the envelop, as represented in Figs. 6 and 7. By this arrangement of the piece 9, as represented in Figs. 6 and 7, the envelop is doubly sealed when its flap is closed down upon the body of the envelop, whereby it will be utterly impossible to get at the contents of the envelop without first serving the doubled-over portion of the said piece 9. In addition to this essential feature these pieces have the same properties of perfectly adhering to the parts of the envelop when sealed, which prevents the separation of the flap from the body of the envelop without tearing or disturbing the fastened edge portions of the said piece 9. The said piece 9 may also be prepared with a coloring-matter capable of being dissolved or undergoing liquefaction when the parts of the envelop are steamed for the purposes hereinabve mentioned.

In Figs. 6, 7, and 8 I have provided the edge portion of the flap 3 of the envelop with a series of perforations 11, through which the colored paper may be seen, thereby providing an ornamental feature as well as an extra means of detection to show that the colored paper has been tampered with by some unauthorized person.

I am aware that changes may be made in the several arrangements and combinations of the devices and parts without departing from the scope of my invention. Hence I do not limit my invention to the exact arrangement and combinations of the parts as herein described, and illustrated in the accompanying drawings.

Having thus described my invention, what I claim is—

1. In a means of detection to indicate that a sealed envelop has been tampered with, the combination, with the body of the envelop and its gummed flap, of a piece of thin material arranged within a part of the said body and having a portion of said thin material extending beyond the mouth of said body, said material having a marginal edge 7 made to conform with the contour of the marginal and gummed edge of the said flap, but being slightly smaller than said gummed edge, all being adapted to be folded and arranged between said body and the gummed flap and sealed in place when the flap is sealed against said body of the envelop, said thin material being prepared with a solutive coloring-matter, substantially as and for the purposes set forth.

2. In a means of detection to indicate that a sealed envelop has been tampered with, the combination, with the body of the envelop and its gummed flap, of a piece of stiff material 5 arranged within the body of the envelop and a piece of tissue-paper attached to said piece of stiff material extending beyond the mouth of the envelop, said piece of tissue-paper having a marginal edge 7 made to conform with the contour of the marginal and gummed edge of the said flap, but being slightly smaller than said gummed edge, all being adapted to be folded and secured between the body of the envelop and the flap when the latter is sealed against the said body of the envelop, substantially as and for the purposes set forth.

3. In a means of detection to indicate that a sealed envelop has been tampered with, the combination, with the body of the envelop and its gummed flap, of a piece of stiff material 5 arranged within the body of the envelop and a piece of tissue-paper attached to said piece of stiff material extending beyond the mouth of the envelop, said piece of tissue-paper having a marginal edge 7 made to conform with the contour of the marginal and gummed edge of the said flap, but being slightly smaller than said gummed edge, all being adapted to be folded and secured between the body of the envelop and the flap when the latter is sealed against the said body of the envelop, the said piece of tissue-paper being prepared with a solutive coloring-matter, substantially as and for the purposes set forth.

In testimony that I claim the invention set forth above I have hereunto set my hand this 29th day of May, 1901.

HARRY G. STARMER.

Witnesses:
 THOMAS L. WHITE,
 DAVID HAHN.